US012662368B2

(12) United States Patent
Holmes

(10) Patent No.: US 12,662,368 B2
(45) Date of Patent: Jun. 23, 2026

(54) TRENCHES FOR DELIVERING SERVICE SUPPLIES

(71) Applicant: Fibrelite Composites Limited, Skipton (GB)

(72) Inventor: David Holmes, Skipton (GB)

(73) Assignee: Fibrelite Composites Limited, Skipton (GB)

( * ) Notice: Subject to any disclaimer, the term of this patent is extended or adjusted under 35 U.S.C. 154(b) by 95 days.

(21) Appl. No.: 18/540,994

(22) Filed: Dec. 15, 2023

(65) Prior Publication Data

US 2025/0197190 A1 Jun. 19, 2025

(51) Int. Cl.

*E01C 11/22* (2006.01)
*B67D 7/78* (2010.01)
*E03F 5/04* (2006.01)

(52) U.S. Cl.

CPC ................ *B67D 7/78* (2013.01); *E01C 11/22* (2013.01); *E03F 5/04* (2013.01)

(58) Field of Classification Search

CPC ........ E01C 11/22; E01C 11/227; E03F 3/046; E03F 5/04; E03F 5/0401; E02B 5/02; E02B 13/00; E04D 13/064; E04D 13/0648; B67D 7/78
USPC ................................. 404/2–4; 405/118, 119
See application file for complete search history.

(56) References Cited

U.S. PATENT DOCUMENTS 5,368,670 A 11/1994 Kauffman
5,636,667 A 6/1997 Young et al.
5,972,468 A * 10/1999 Welch ....................... B32B 3/12 428/137
9,038,856 B2 5/2015 Larsson
10,214,411 B2 2/2019 Fieglein et al.
10,269,082 B2 4/2019 Morris et al.
10,577,237 B2 3/2020 Fieglein
10,726,508 B2 7/2020 Morris et al.
11,276,051 B2 3/2022 Tang et al.
11,429,945 B2 8/2022 Fieglein et al.
(Continued)

FOREIGN PATENT DOCUMENTS

DE 9421617 U1 * 5/1996
DE 102020113909 A1 * 11/2021 ............ E03F 5/0407
EP 1870519 A2 * 12/2007 ............ E01C 11/227
(Continued)

OTHER PUBLICATIONS

Fibrelite, "FRP Composite Trench Panels: Technical Guide," Nov. 22, 2020.
(Continued)

*Primary Examiner* — Sunil Singh
(74) *Attorney, Agent, or Firm* — Mintz, Levin, Cohn, Ferris, Glovsky and Popeo, P.C. US

(57) ABSTRACT

Various exemplary devices, systems, and methods for trenches for delivering a service supply are provided. In general, a trench, which may also be referred to as a "trough," is configured to be located underground and "house" pipes or other conduits therein through which a service supply is configured to be provided from a source of the service supply to a point of end use. Examples of a service supply include power, data, and fuel. In an exemplary implementation, the trench includes a plurality of interconnected support beams and is a composite trench formed of different materials.

10 Claims, 9 Drawing Sheets

(56) References Cited

U.S. PATENT DOCUMENTS

2023/0196360 A1 6/2023 Weston et al.

FOREIGN PATENT DOCUMENTS

| | | | |
|---|---|---|---|
| FR | 2201384 | A1 | 4/1974 |
| KR | 101089144 | B1 | 12/2011 |
| WO | 2025126003 | A1 | 6/2025 |

OTHER PUBLICATIONS

International Search Report and Written Opinion for PCT Pat. App. No. PCT/IB2024/062333 mailed Mar. 4, 2025 (15 pages).

* cited by examiner

FIG. 6
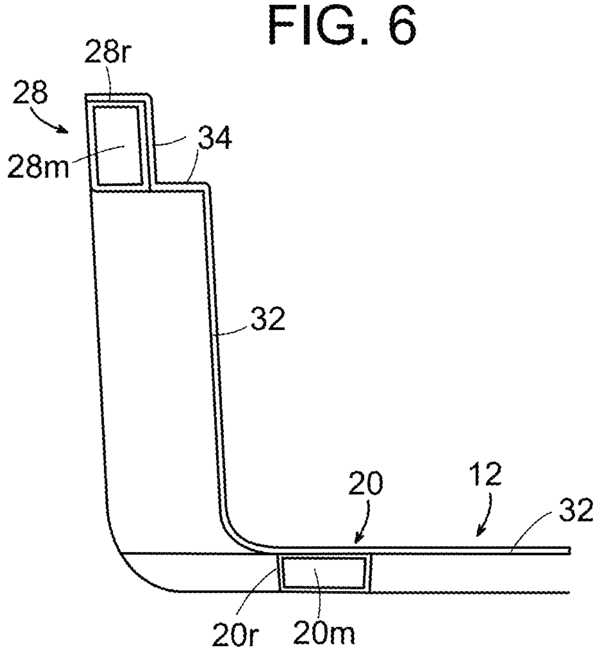
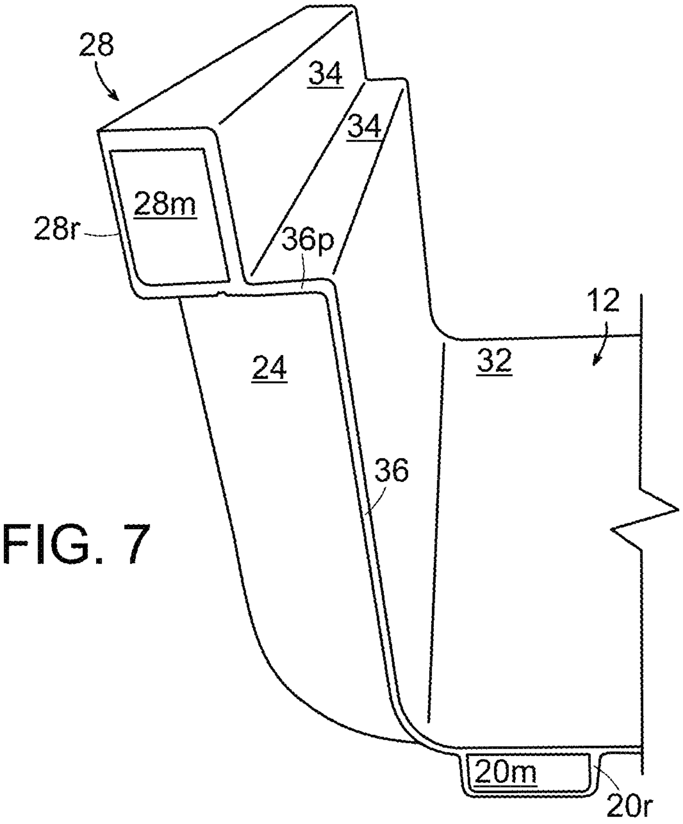
FIG. 7

300

FIG. 14
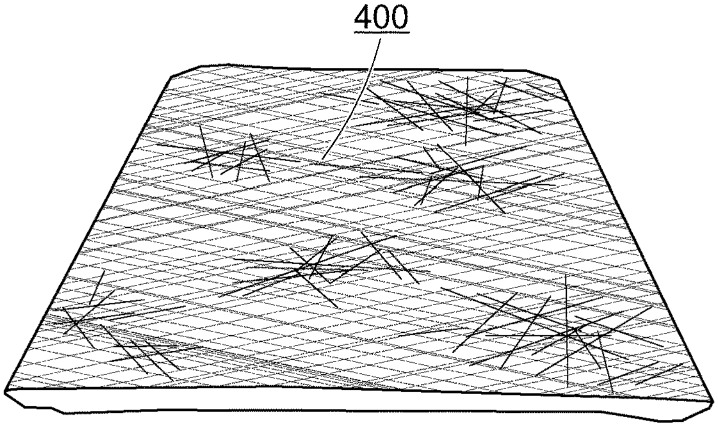
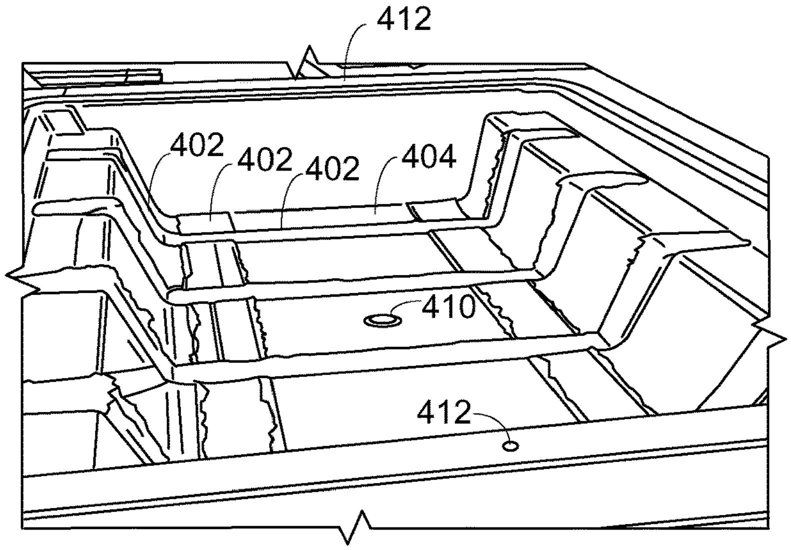
FIG. 15
FIG. 16
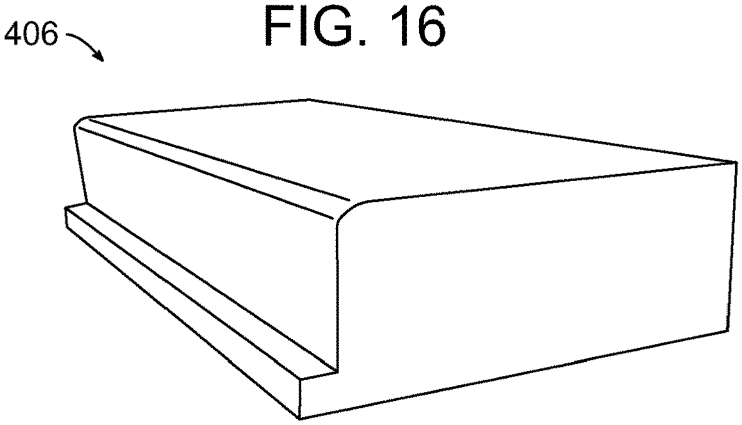

TRENCHES FOR DELIVERING SERVICE SUPPLIES

FIELD

The present disclosure relates generally to trenches for delivering service supplies.

BACKGROUND

Underground services can be either direct buried in a duct or, more commonly, housed within a trench to provide protection, easy access, and provision for future state upgrades. The trenches must have sufficient strength and stiffness to not break under pressures applied thereto, e.g., by conduits and surrounding substrate therein; from above ground by vehicle wheels, by pavement, and/or by other force providers; etc. However, it is difficult to consistently and cost effectively manufacture trenches with sufficient strength and stiffness.

Additionally, multiple trenches are typically fit together to extend between a source of service supply to a user format. One example of a service supply, a source of the service supply, and a user format is fuel, an underground fuel reservoir, and a fuel dispenser. Different paths are usually needed in different locations to account for different site conditions, different underground conditions, etc. Consistently manufacturing trenches may help ensure that trenches can be securely fixed together, but it is difficult to consistently manufacture trenches using current trench manufacturing techniques.

Accordingly, there remains a need for improved trenches for delivering service supplies.

SUMMARY

In general, devices, systems, and methods for trenches for delivering service supplies are provided.

In one aspect, an apparatus for delivering a service supply is provided that in one implementation includes a trench configured to be buried underground to allow a service supply to pass therethrough from a source of the service supply to a point of end use. The trench includes a base, first and second sides extending upwardly from the base, the first and second sides being opposed to one another, first and second longitudinal beams on a bottom side of the base, a plurality of transverse beams on the bottom side of the base that extend transverse to the pair of longitudinal beams, a plurality of first side beams that extend upwardly from the base on an outer side of the first side, a plurality of second side beams that extend upwardly from the base on an outer side of the second side, a first top beam extending longitudinally along a top of the first side, and a second top beam extending longitudinally along a top of the second side. Foam is surrounded by fiberglass within each of the first and second longitudinal beams, the plurality of transverse beams, the plurality of first side beams, the plurality of second side beams, the first top beam, and the second top beam.

The apparatus can vary in any number of ways. For example, the first and second longitudinal beams, the plurality of transverse beams, the plurality of first side beams, the plurality of second side beams, the first top beam, and the second top beam can be interconnected. Further, the plurality of first side beams can be directly connected to the foam of the first top beam, the foam of the plurality of second side beams can be directly connected to the foam of the second top beam, the foam of the first and second side beams can be directly connected to the foam of the plurality of transverse beams, and the foam of the plurality of transverse beams can be directly connected to the foam of the first and second longitudinal beams. Further, the foam can be polyurethane.

For another example, the fiberglass can have a varying thickness.

For yet another example, the plurality of transverse beams can extend substantially perpendicular to the first and second longitudinal beams and the first and second top beams.

For still another example, the trench can have first and second opposed ends each being substantially U-shaped. Further, the first end of the trench can be configured to be fixedly attached to a third end of a second trench via a lap joint, and the second end of the trench can be configured to be fixedly attached to a fourth end of a third trench via a lap joint.

For another example, the foam can be polyurethane.

For yet another example, the service supply can be fuel, the source of the service supply can be an underground reservoir, and the point of end use can be a fuel dispenser.

For another example, the service supply can be power, the source of the service supply can be a power source, and the point of end use can be a device configured to be powered using the power.

For yet another example, the service supply can be data, the source of the service supply can be a first computer system, and the point of end use can be a second computer system configured to store the data in a memory, process the data using a processor, and/or display the data on a display screen.

In another implementation, an apparatus for delivering a service supply includes a trench manufactured using a method of manufacturing a trench for delivering a service supply that includes positioning a plurality of foam beams wrapped with fiberglass into a female mold tool, wrapping a male mold tool with at least one fiberglass layer, and mating together the female mold tool, having the foam beams positioned therein, and the male mold tool, being wrapped with the fiberglass layer, to form a closed mold environment. The method also includes injecting a fiberglass resin into the closed mold environment so as to form a trench configured to be buried underground to allow a service supply to pass therethrough from a source of the service supply to a point of end use.

The apparatus can have any number of variations. For example, the trench can include a base, the trench can include first and second sides extending upwardly from the base, the first and second sides can be opposed to one another, the trench can include the plurality of foam beams, and the plurality of foam beams can include first and second longitudinal beams on a bottom side of the base, a plurality of transverse beams on the bottom side of the base that extend transverse to the pair of longitudinal beams, a plurality of first side beams that extend upwardly from the base on an outer side of the first side, a plurality of second side beams that extend upwardly from the base on an outer side of the second side, a first top beam extending longitudinally along a top of the first side, and a second top beam extending longitudinally along a top of the second side.

For another example, the foam can be polyurethane.

For yet another example, the service supply can be fuel, the source of the service supply can be an underground reservoir, and the point of end use can be a fuel dispenser.

For another example, the service supply can be power, the source of the service supply can be a power source, and the point of end use can be a device configured to be powered using the power.

For yet another example, the service supply can be data, the source of the service supply can be a first computer system, and the point of end use can be a second computer system configured to store the data in a memory, process the data using a processor, and/or display the data on a display screen.

In another aspect, a method of manufacturing a trench for delivering a service supply is provided that in one implementation includes forming an apparatus in a closed mold environment in which a fiberglass resin is injected between a female mold tool and a male mold tool. The apparatus includes a trench configured to be buried underground to allow a service supply to pass therethrough from a source of the service supply to a point of end use. The trench includes a base, first and second sides extending upwardly from the base, the first and second sides being opposed to one another, first and second longitudinal beams on a bottom side of the base, a plurality of transverse beams on the bottom side of the base that extend transverse to the pair of longitudinal beams, a plurality of first side beams that extend upwardly from the base on an outer side of the first side, a plurality of second side beams that extend upwardly from the base on an outer side of the second side, a first top beam extending longitudinally along a top of the first side, and a second top beam extending longitudinally along a top of the second side. Foam is surrounded by fiberglass within each of the first and second longitudinal beams, the plurality of transverse beams, the plurality of first side beams, the plurality of second side beams, the first top beam, and the second top beam.

The method can vary in any number of ways. For example, the foam can be located between the female and male mold tools prior to the injection. Further, the foam can be polyurethane.

For another example, the first and second longitudinal beams, the plurality of transverse beams, the plurality of first side beams, the plurality of second side beams, the first top beam, and the second top beam can be interconnected. Further, the plurality of first side beams can be directly connected to the foam of the first top beam, the foam of the plurality of second side beams can be directly connected to the foam of the second top beam, the foam of the first and second side beams can be directly connected to the foam of the plurality of transverse beams, and the foam of the plurality of transverse beams can be directly connected to the foam of the first and second longitudinal beams. Further, the foam can be polyurethane.

For yet another example, the fiberglass can have a varying thickness.

For another example, the plurality of transverse beams can extend substantially perpendicular to the first and second longitudinal beams and the first and second top beams.

For still another example, the trench can have first and second opposed ends each being substantially U-shaped. Further, the first end of the trench can be configured to be fixedly attached to a third end of a second trench via a lap joint, and the second end of the trench can be configured to be fixedly attached to a fourth end of a third trench via a lap joint.

For another example, the foam can be polyurethane.

For yet another example, the service supply can be fuel, the source of the service supply can be an underground reservoir, and the point of end use can be a fuel dispenser.

For another example, the service supply can be power, the source of the service supply can be a power source, and the point of end use can be a device configured to be powered using the power.

For yet another example, the service supply can be data, the source of the service supply can be a first computer system, and the point of end use can be a second computer system configured to store the data in a memory, process the data using a processor, and/or display the data on a display screen.

In another implementation, a method of manufacturing a trench for delivering a service supply, includes positioning a plurality of foam beams wrapped with fiberglass into a female mold tool, wrapping a male mold tool with at least one fiberglass layer, and mating together the female mold tool, having the foam beams positioned therein, and the male mold tool, being wrapped with the fiberglass layer, to form a closed mold environment. The method also includes injecting a fiberglass resin into the closed mold environment so as to form a trench configured to be buried underground to allow a service supply to pass therethrough from a source of the service supply to a point of end use.

The method can have any number of variations. For example, the method can also include wrapping the foam beams with the fiberglass, the fiberglass can include at least one woven fiberglass panel, and the at least one fiberglass layer can include at least one woven fiberglass panel.

For another example, the foam can be polyurethane.

For yet another example, the plurality of foam beams can be interconnected.

For still another example, the trench can include a base, the trench can include first and second sides extending upwardly from the base, the first and second sides can be opposed to one another, the trench can include the plurality of foam beams, and the plurality of foam beams can include first and second longitudinal beams on a bottom side of the base, a plurality of transverse beams on the bottom side of the base that extend transverse to the pair of longitudinal beams, a plurality of first side beams that extend upwardly from the base on an outer side of the first side, a plurality of second side beams that extend upwardly from the base on an outer side of the second side, a first top beam extending longitudinally along a top of the first side, and a second top beam extending longitudinally along a top of the second side. Further, the first and second longitudinal beams, the plurality of transverse beams, the plurality of first side beams, the plurality of second side beams, the first top beam, and the second top beam can be interconnected. Further, the foam of the plurality of first side beams can be directly connected to the foam of the first top beam, the foam of the plurality of second side beams can be directly connected to the foam of the second top beam, the foam of the first and second side beams can be directly connected to the foam of the plurality of transverse beams, and the foam of the plurality of transverse beams can be directly connected to the foam of the first and second longitudinal beams. Further, the foam can be polyurethane.

For yet another example, the service supply can be fuel, the source of the service supply can be an underground reservoir, and the point of end use can be a fuel dispenser.

For another example, the service supply can be power, the source of the service supply can be a power source, and the point of end use can be a device configured to be powered using the power.

For yet another example, the service supply can be data, the source of the service supply can be a first computer system, and the point of end use can be a second computer system configured to store the data in a memory, process the data using a processor, and/or display the data on a display screen.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 6 is a schematic side cross-sectional view of a portion of the trench of FIGS. 1 and 2;

FIG. 7 is a perspective cross-sectional view of a portion of the trench of FIGS. 1 and 2;

FIG. 14 is a perspective view of a sheet or panel of woven fiberglass;

FIG. 15 is a perspective view of a portion of a female mold tool having fiberglass-wrapped foam beams positioned in recesses of the female mold tool;

FIG. 16 is a perspective view of a portion of a male mold tool; and

DETAILED DESCRIPTION

Figure 1:
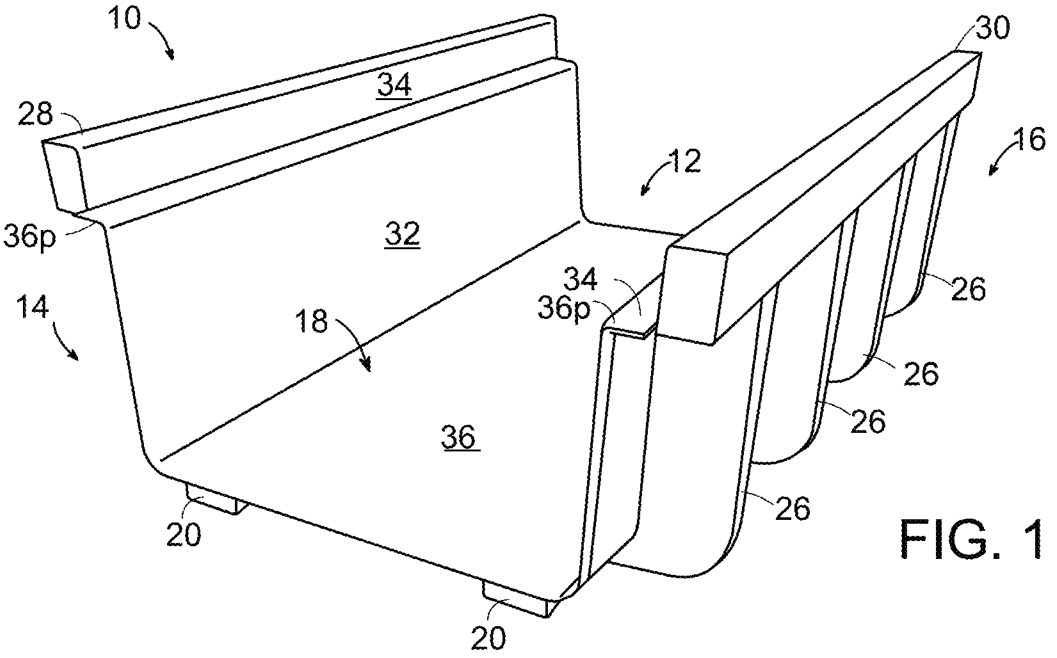
FIG. 1 is a perspective view of one implementation of a trench.

Certain exemplary embodiments will now be described to provide an overall understanding of the principles of the structure, function, manufacture, and use of the devices, systems, and methods disclosed herein. One or more examples of these embodiments are illustrated in the accompanying drawings.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the dimensions of the subject in which the systems and devices will be used, the size and shape of components with which the systems and devices will be used, and the methods with which the systems and devices will be used.

Various exemplary devices, systems, and methods for trenches for delivering service supplies are provided. In general, a trench, which may also be referred to as a "trough," is configured to be located underground and "house" pipes or other conduits therein through which a service supply is configured to be provided from a source of the service supply to a point of end use. Examples of a service supply include power, data, and fuel. The point of end use can be a user terminal configured to allow a user to access the service supply. In one example, the service supply is fuel and the user terminal is a fuel dispenser.

In an exemplary implementation, the trench includes a plurality of interconnected support beams. The beams are configured to provide strength and stiffness to the trench and to allow load applied to the trench to be distributed and eliminate trench settlement. The strength and stiffness provided by the beams may allow impact to be absorbed from above-ground forces (such as forces from vehicular wheels, etc.), may maintain alignment of the trench and avoid twisting, and may overcome imposed hydrostatic and back-fill (angle of repose) media loads from compaction. The trench is a composite trench formed of different materials. Being formed of different materials may allow the trench to be manufactured consistently and cost effectively and to have sufficient strength and stiffness to not break under pressures applied thereto, e.g., by the conduits and the service supplies passing therethrough; from above ground by vehicle wheels, by pavement, and/or by other force providers; etc. In an exemplary implementation, the composite trench is formed of a fiberglass shell and foam beams interconnected together and surrounded by fiberglass.

In an exemplary implementation, a composite trench including a plurality of interconnected support beams is configured to be manufactured using a transfer molding process in which a casting material (e.g., a fiberglass resin) is forced into a closed mold environment. A vacuum is also applied to evacuate any entrapped air from the closed mold environment, help close the female and male tools tightly, and help encourage flow of the casting material. The closed mold environment is formed from a male mold tool and a female mold tool configured to mate with the male molding tool. The female mold tool includes a plurality of recesses configured to receive individual beams therein. The transfer molding process may allow for predictable and consistent wall thickness of the trench, which may help ensure that the trench has improved strength and stiffness over trenches manufactured using current techniques and may facilitate connection of trenches together since walls of adjacent trenches will match in thickness.

As mentioned above, in an exemplary implementation, each of the beams is formed of foam. In an exemplary implementation of the manufacturing process, the individual foam beams are wrapped in fiberglass prior to be positioned in their respective recesses of the female mold tool. The fiberglass wrapping may provide reinforcement to effectively transfer and dissipate imposed loads and thereby improve strength and stiffness of the manufactured trench. Fiberglass is also configured to be layered in the male mold tool, prior to mating with the female mold tool, which may also provide reinforcement to effectively transfer and dissipate imposed loads and thereby improve strength and stiffness of the manufactured trench. In an exemplary implementation, the fiberglass wrapped around the individual beams and layered in the male mold tool are woven sheets or panels of fiberglass.

Other types of manufacturing techniques cannot result in a trench with as much strength and stiffness as trenches manufactured using the techniques described herein. For example, in a spray lamination technique, fiberglass is pulled into a machine, chopped into small pieces, and the small pieces are sprayed by hand onto a mold simultaneously with resin. Small pieces of fiberglass are less strong than woven sheets or panels of fiberglass. Additionally, it is difficult to control an amount of fiberglass and resin that is being sprayed such that different trenches are different from one another in amount of fiberglass and resin such that different trenches have different strength and stiffness, different wall thicknesses, and may not connect together securely.

For another example, in a hand-lay technique, fiberglass is placed onto a mold, and then resin is applied by hand onto the mold using a roller or other application tool. The fiberglass can be woven sheets or panels of fiberglass, but in the hand-lay technique, it is difficult to control an amount of resin that is being applied to the fiberglass such that different trenches are different from one another in amount of resin such that different trenches have different strength and stiffness, different wall thicknesses, and may not connect together securely. Additionally, as resin is applied to a surface of the fiberglass on the mold, the resin wets the fiberglass. However, with hand-laying there is a high probability that dry areas of the fiberglass will be present, e.g., because resin is not applied sufficiently and consistently over the entire fiberglass surface. The dry areas of the fiberglass create weakness in the resulting trench structure.

For both a spray lamination technique and a hand-lay technique, quality and structure of the resulting trench relies on the ability and concentration of the particular operator performing the spraying or hand-laying such that different trenches made by different operators will very likely not be consistent with one another. Even trenches made by a same operator at different times will likely not be consistent with one another.

Figure 2:
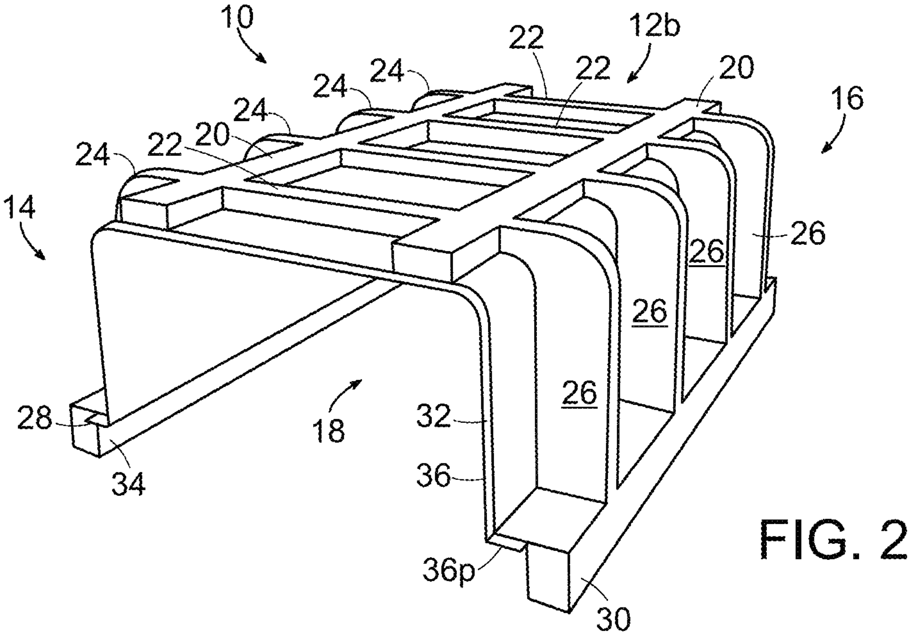
FIG. 2 is another perspective view of the trench of FIG. 1.

FIGS. 1 and 2 illustrate one implementation of a trench 10 configured to deliver a service supply from a source of the service supply to a point of end use. The trench 10 is configured to be manufactured using a transfer molding process as described herein. The trench 10 is described further below.

Figure 3:
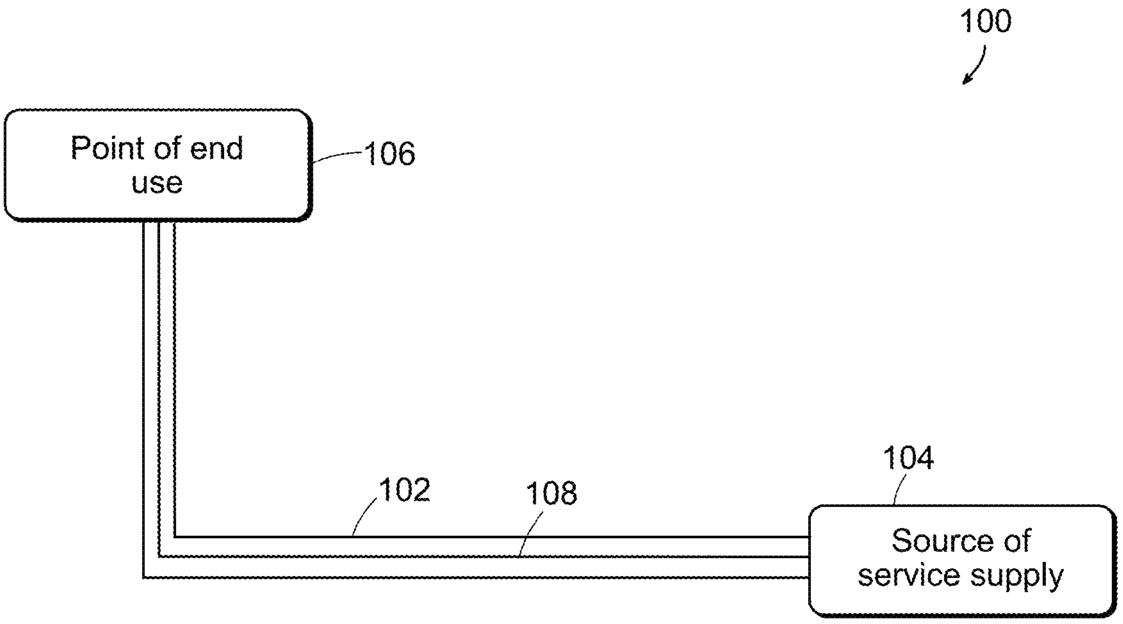
FIG. 3 is a schematic view of one implementation of a trench extending between a source and a point of end use.

FIG. 3 illustrates one implementation of a system 100 including a trench 102 (e.g., the trench 10 of FIGS. 1 and 2, a trench 102 of FIG. 3, a trench 200 of FIG. 12, etc.) configured to deliver a service supply from a source 104 of the service supply to a point of end use 106. At least one pipe and/or other conduit 108 configured to pass fuel therethrough are located in the trench 102 to facilitate passage of the service supply through the trench 102, as will be appreciated by those skilled in the art. Only one point of end use 106 is shown in communication with the source 104 in FIG. 3, but multiple points of end use can be in communication with the source 104. A path of the trench 102 between the source 104 to the point of end use 106 has an L-shape in this illustrated implementation. However, as will be appreciated by those skilled in the art, the path between the source 104 and the point of end use 106 can have any of a variety of shapes and can include branches to allow the service supply to be supplied from the source 104 to the point of end use 106 and at least one additional point of end use.

In one example, the service supply is power, the source of the service supply is a generator or other power source, and the point of end use is a device configured to be powered using the power.

In another example, the service supply is data, the source of the service supply is a server or other computer system, and the point of end use is a client computer system configured to store the data in a memory, process the data using a microcontroller or other processor, and/or display the data on a touchscreen or other display screen.

Figure 4:
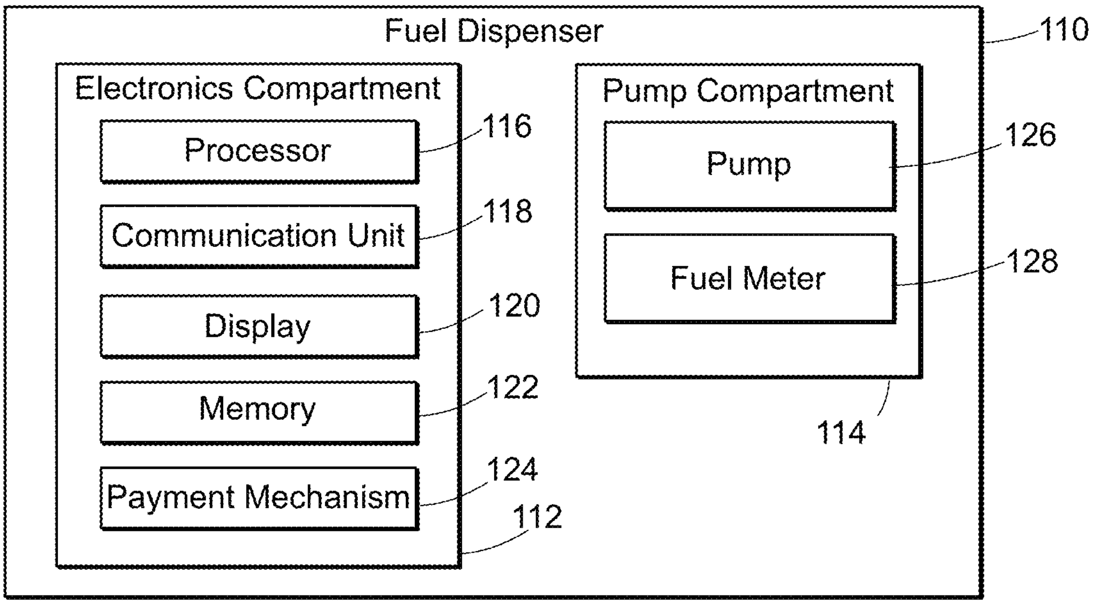
FIG. 4 is a schematic view of one implementation of a fuel dispenser.

In yet another example, the service supply is fuel, the source of the service supply is an underground fuel reservoir, and the point of end use is a fuel dispenser. A fuel reservoir is also referred to herein as a "reservoir" or "storage tank." FIG. 4 illustrates one implementation of a fuel dispenser 110 that can be used as the point of end use 106 of FIG. 3. As shown in FIG. 4, the fuel dispenser 110 includes an electronics compartment 112 and a pump compartment 114. The electronics compartment 112 has therein electronics for facilitating payment for fuel (and/or other good and/or services) and for facilitating the dispensing of the fuel. The electronics include, for example, a processor 116 configured to control various electronic components of the fuel dispenser 110 and dispensing of the fuel from the pump compartment 114, a communication unit 118 configured to electronically communicate wired and/or wirelessly over a network, a display 120 configured to show information (e.g., media content, payment information, etc.) thereon, a memory 122 configured to store data therein that is readable by the processor 116, and a payment mechanism 124 (e.g., a card reader, a Near Field Communication (NFC) module, etc.) configured to facilitate payment for fuel (and/or other good and/or services). The fuel dispenser 110 can be configured for mobile payment in addition to (or instead of) payment through the fuel dispenser 110.

The pump compartment 114 of the fuel dispenser 110 can, as in this illustrated implementation, have therein a pump 126 configured to pump fuel from a reservoir (e.g., the point of end use 104 of FIG. 3 or other reservoir) and has therein a fuel meter 128 configured to monitor fuel flow. The pump compartment 126 can include other elements to facilitate fuel dispensing, such as valves, a vapor recovery system, etc., as will be appreciated by a person skilled in the art. Fuel is configured to flow through the pump compartment 114 to a hose (not shown) and out of a nozzle (not shown) at an end of the hose. The fuel dispenser 110 can include any number of hoses and associated nozzles.

Figure 5:
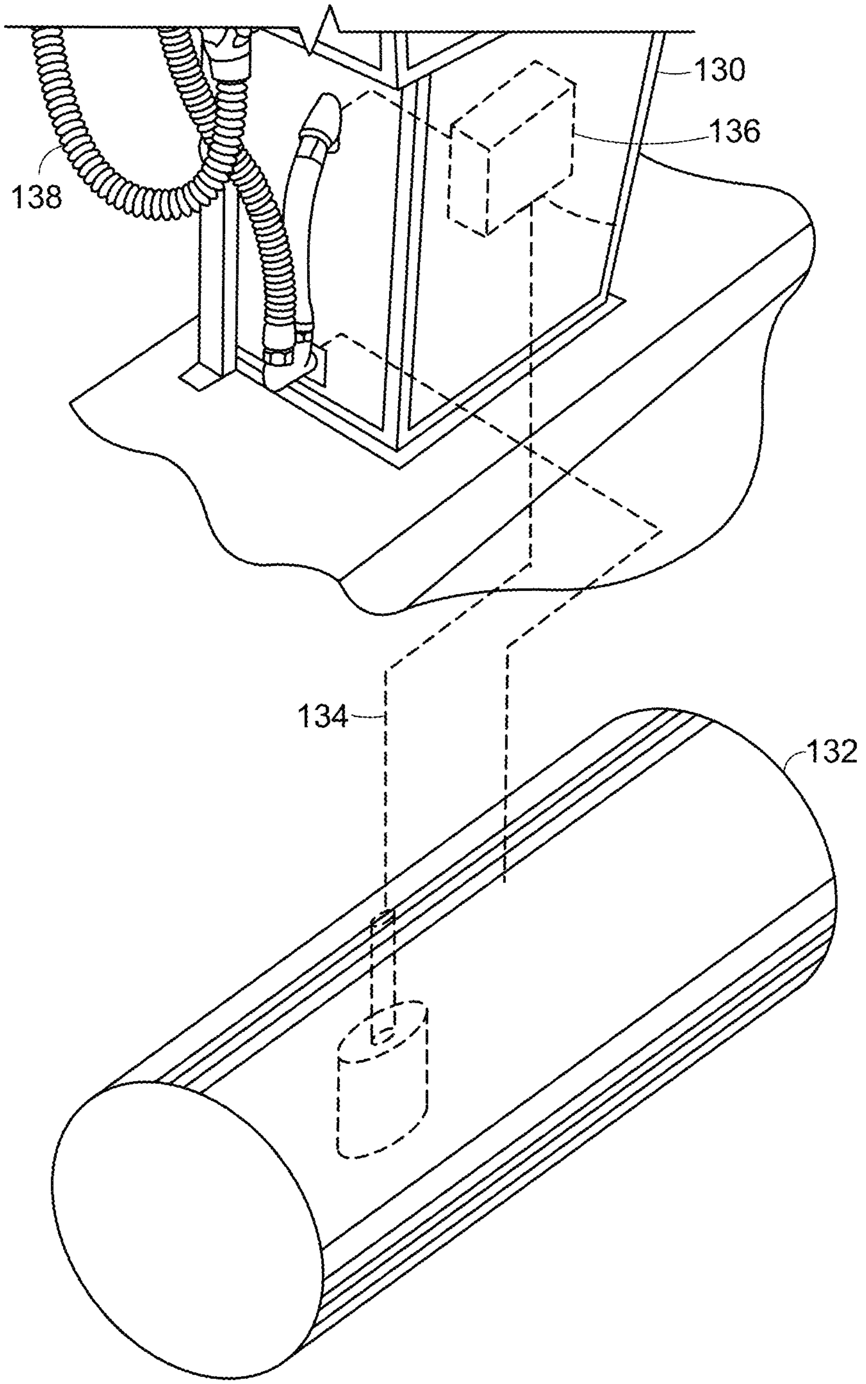
FIG. 5 is a perspective view of one implementation of a fuel path extending between an underground fuel reservoir and an above-ground fuel dispenser.

FIG. 5 illustrates another implementation of a fuel dispenser 130 that can be used as the point of end use 106 of FIG. 3 and one implementation of a reservoir 132 that can be used as the source 104 of FIG. 3. The fuel dispenser 130 is partially shown in FIG. 5. A path 134 between the fuel dispenser 130 and the reservoir 132 along which a trench (e.g., the trench 10 of FIGS. 1 and 2, the trench 102 of FIG. 3, a trench 200 of FIG. 12, etc.) is located underground is represented in FIG. 5 with a dotted line. Fuel stored in the reservoir 132 is configured to flow from the reservoir 132 along the path 134 to a pump compartment of the fuel dispenser 130, e.g., as pumped to the fuel dispenser 130 by a pump (not shown in FIG. 5). A fuel meter 136 of the fuel dispenser 130 is configured to monitor flow of the fuel as the fuel flows through the pump compartment to a hose 138 and out of a nozzle (not shown in FIG. 5) at an end of the hose 138. The fuel dispenser 130 is shown with one hose 138 in this illustrated implementation but can include any number of hoses and associated nozzles.

A person skilled in the art will appreciate that the fuel dispensers 110, 130 of FIGS. 4 and 5 and the fuel reservoir 132 of FIG. 5 can have various other configurations. Various exemplary embodiments of fuel dispensers and/or fuel reservoirs are described further in, for example, U.S. Pat. No. 5,636,667 entitled "Conversion Of Fuel Dispensers To Provide For Vacuum Assisted Vapor Recovery" issued Jun. 15, 1999, U.S. Pat. No. 9,038,856 entitled "Fluid Dispensing Unit Having A Circulation System And A Method For Circulating A Fluid In A Fluid Dispensing Unit" issued May 26, 2015, U.S. Pat. No. 10,214,411 entitled "Fuel Dispenser Communication" issued Feb. 26, 2019, U.S. Pat. No. 10,269,082 entitled "Intelligent Fuel Dispensers" issued Apr. 23, 2019, U.S. Pat. No. 10,577,237 entitled "Methods And Devices For Fuel Dispenser Electronic Communication" issued Mar. 3, 2020, U.S. Pat. No. 10,726,508 entitled "Intelligent Fuel Dispensers" issued Jul. 28, 2020, U.S. Pat. No. 11,276,051 entitled "Systems And Methods For Convenient And Secure Mobile Transactions" issued Mar. 15, 2022, U.S. Pat. No. 11,429,945 entitled "Outdoor Payment Terminals" issued Aug. 30, 2022, and U.S. Pat. App. Pub. No. 2023/0196360 entitled "Conducting Fuel Dispensing Transactions" published Jun. 22, 2023, which are hereby incorporated by reference in their entireties.

Referring again to FIGS. 1 and 2, the trench 10 includes a base 12 and first and second sides 14, 16. The first and second sides 14, 16 are opposed to one another and extend upwardly from the base 12. In the view of FIGS. 1 and 2, the first and second sides 14, 16 are left and right sides of the trench 10, respectively. The base 12 and the first and second sides 14, 16 define a U-shaped cross-sectional shape.

A channel 18 is defined above the base 12 and between the first and second sides 14, 16. The channel 18 is configured to receive therein at least one pipe and/or other conduit configured to provide a service supply. The channel 18 is open at its front (facing outward of the page in the view of FIGS. 1 and 2), rear (facing into the page in the view of FIGS. 1 and 2), and top (facing upward in the view of FIG. 1 and downward in the view of FIG. 2).

The base 12 defines a bottom of the trench 10. The trench 10 is configured to be buried underground with the base 12 being horizontally-oriented and downwardly-located such that the top of the channel 18 faces upward, e.g., toward a ground surface.

The trench 10 is substantially linear in this illustrated implementation with the front and rear of the channel 18 being aligned along a longitudinal axis of the channel 18, which also defines a longitudinal axis of the trench 10. A person skilled in the art will appreciate that extension may not be precisely linear but nevertheless be considered substantially linear due to any number of factors, such as manufacturing tolerances and sensitivity of measurement equipment. In other implementations, the trench 10 can have another shape, such as L-shaped in which a trench channel's front and rear are arranged at about 90 degrees with respect to one another. A person skilled in the art will appreciate that an angle may not be at a precise value but nevertheless be considered about at that value due to any number of factors, such as manufacturing tolerances and sensitivity of measurement equipment. Trenches having different shapes may facilitate positioning of trenches underground to form a desired path between a source and a point of end use.

The trench 10 includes a plurality of interconnected beams (also referred to herein as "support beams"). As shown in FIGS. 1 and 2, the plurality of interconnected beams include a plurality of longitudinal beams 20 extending longitudinally on a bottom side 12*b* of the base 12, a plurality of transverse beams 22 on the bottom side 12*b* of the base 12 that extend transverse to the plurality of longitudinal beams 20, a plurality of first side beams 24 that extend upwardly from the base 12 on an outer side of the first side 14 of the trench 10, a plurality of second side beams 26 that extend upwardly from the base 12 on an outer side of the second side 16 of the trench 10, a first top beam 28 extending along a top of the first side 14 of the trench 10, and a second top beam 30 extending along a top of the second side 16 of the trench 10. The trench 10 also includes a shell (also referred to herein as a "trench shell") 32 that surrounds the various interconnected beams. The trench shell 32 has a varying thickness, which may provide greater rigidity and strength to the trench 10 where required by the shell 32 being thicker in some locations than in other locations.

The plurality of longitudinal beams 20 are configured to provide base 12 stability, structural support, and a greater base 12 surface area to dissipate the load and eliminate trench 10 settlement. The plurality of longitudinal beams 20 extend substantially parallel to one another. A person skilled in the art will appreciate that elements may not be precisely parallel but nevertheless be considered substantially parallel due to any number of factors, such as manufacturing tolerances and sensitivity of measurement equipment. The plurality of longitudinal beams 20 in this illustrated implementation includes two longitudinal beams 20, although another plural number is possible. The longitudinal beams 20 in this illustrated implementation are offset laterally with a first one of the longitudinal beams 20 extending near the first side 14 of the trench 10 and a second one of the longitudinal beams 20 extending near the second side 16 of the trench 10.

Each of the plurality of transverse beams 22 intersects at a transverse angle each of the plurality of longitudinal beams 20 on the bottom side 12*b* of the base 12. The transverse angle is about 90 degrees in this illustrated implementation such that the plurality of transverse beams 22 are substantially perpendicular to the plurality of longitudinal beams 20. A person skilled in the art will appreciate that elements may not be precisely perpendicular but nevertheless be considered substantially perpendicular due to any number of factors, such as manufacturing tolerances and sensitivity of measurement equipment. In an exemplary implementation, the plurality of transverse beams 22 are spaced substantially equidistantly from one another. Additionally, the plurality of transverse beams 22 connect the plurality of first side beams 24 and the plurality of second side beams 26 on the sides 14, 16 of the trench 10. Each one of the plurality of transverse beams 22 is associated with one of the plurality of first side beams 24 and one of the plurality of second side beams 26. The trench 10 thus includes an equal number of transverse beams 22, first side beams 24, and second side beams 26. In this illustrated implementation, the trench 10 includes four each of transverse beams 22, first side beams 24, and second side beams 26, although a different plural number is possible. For example, a trench having less longitudinal length than the illustrated trench 10 may include fewer than four transverse beams, first side beams, and second side beams, and a trench having greater longitudinal length than the illustrated trench 10 may include more than four transverse beams. The plurality of transverse beams 22 being interconnected with the plurality of longitudinal beams 20, the plurality of first side beams 24, and the plurality of second side beams 26 is configured to give structural support and provide a greater surface area to dissipate the load and eliminate trench 10 settlement.

The plurality of first side beams 24 and the plurality of second side beams 26 define ribs on outer surfaces of their respective sides 14, 16 of the trench 10. The plurality of first side beams 24 and the plurality of second side beams 26 are configured to give strength and stiffness to the trench shell 32 to overcome imposed hydrostatic and backfill (angle of repose) media loads from compaction. In an exemplary implementation, the plurality of first side beams 24 are spaced substantially equidistantly from one another and the plurality of second side beams 26 are spaced substantially equidistantly from one another.

The first top beam 28 and second top beam 30 extends along a top of the first and second sides 14, 16 of the trench 10, respectively. Since the trench 10 is substantially linear in this illustrated implementation, each of the first and second side beams 24, 26 extends longitudinally and substantially parallel to the plurality of longitudinal beams 20. Each of the first and second top beams 28, 30 is connected to the first and second side beams 24, 26. The first and second top beams 28, 30 are configured to give strength and stiffness to a vertical wall of respective first and second rebates 34 of the trench 10, to absorb impact from above-ground forces (such as forces from vehicular wheels, etc.), and to maintain alignment of the trench 10 and avoid twisting. The first and second top beams 28, 30 experience most of the above-ground forces applied to the trench 10 from vehicle wheels (with the trench cover experiencing most of the load applied from the vehicle itself), so the trench 10 including the first and second top beams 28, 30 may particularly help the trench 10 impact from vehicular wheels as a vehicle drives over the trench 10 buried underground.

The first and second rebates 34 extend longitudinally and are located on inner sides of the first and second sides 14, 16 of the trench 10, respectively. Each of the first and second rebates 34 has a substantially L-shaped cross-sectional shape. The vertical walls of the first and second rebates 34 abut their respective associated ones of the first and second top beams 28, 30, as mentioned above. Horizontal walls of the first and second rebates 34 abut respective top first and second sides of the trench shell 32.

The first and second rebates 34 are configured to engage a trench cover (not shown in FIGS. 1 and 2) with the cover seated on the horizontal walls of the opposed rebates 34 and abutting the vertical walls of the opposed rebates 34. The trench cover (also referred to herein as a “trench panel” is configured to be coupled to the trench 10, as will be appreciated by a person skilled in the art, to cover the open top of the channel 18. For example, an FRP composite trench panel available from Fibrelite of Smithfield, NC can be used a trench panel.

A rim at a front end of the trench shell 10 defines a first ship lap (also referred to herein as a “lap joint”) 36, and a rim at a rear end of the trench shell 10 defines a second ship lap (obscured in FIGS. 1 and 2). The first and second ship laps 36 are thus located at opposed front and rear ends of the trench 10. As shown in FIG. 1, the first and second ship laps 36 are each substantially U-shaped with a horizontal lip **36*p*** extending laterally outward from a top of each end of the “U” shape.

The first and second ship laps 36 are configured to facilitate connection of the trench 10 to a first additional trench at the front end of the trench 10 at the first lap joint 36 and to a second additional trench at the rear end of the trench 10 at the second lap joint. The first and second additional trenches can generally be configured similar to the trench 10 of FIGS. 1 and 2, although one or both of the first and second additional trenches may not extend linearly but instead be, for example, L-shaped. Only one of the first and second additional trenches may be attached to the trench 10 depending on where the trench 10 is located along a path between source and point of use. In an exemplary implementation, to fixedly connect the trench 10 to the first additional trench, an adhesive sealant is applied to the first ship lap 36 of the trench 10 and/or a corresponding ship lap of the first additional trench, and the first ship lap 36 of the trench 10 and the corresponding ship lap of the first additional trench are joined together. Similarly, to fixedly connect the trench 10 to the second additional trench, an adhesive sealant is applied to the second ship lap of the trench 10 and/or a corresponding ship lap of the second additional trench, and the second ship lap of the trench 10 and the corresponding ship lap of the second additional trench are joined together. One example of the adhesive sealant is SL-100 urethane sealant. The ship laps and adhesive sealant are sufficient to fixedly join two adjacent trenches together. However, in some implementations, a metal jointing plate can be attached to an exterior of adjacent trenches to further help fix the trenches together.

The plurality of longitudinal beams 20, the plurality of transverse beams 22, the plurality of first side beams 24, the plurality of second side beams 26, the first top beam 28, and the second top beam 30 are interconnected due to each of the beams being directly connected to at least one other type of beam. As discussed above, the plurality of transverse beams 22 are directly connected to the plurality of longitudinal beams 20, the plurality of longitudinal beams 20 are directly connected to the first and second side beams 24, 26, the first side beams 24 are directly connected to the first top beam 28, and the second side beams 26 are directly connected to the second top beam 30.

In an exemplary implementation, each of the interconnected support beams 20, 22, 24, 26, 28, 30 is formed of a foam encapsulated by fiberglass. In an exemplary implementation, the foam is polyurethane (PU).

Figure 8:
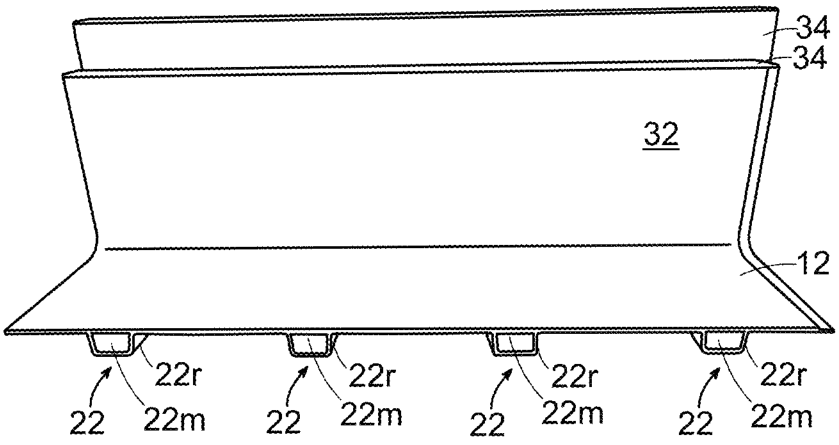
FIG. 8 is another perspective cross-sectional view of a portion of the trench of FIGS. 1 and 2.

FIGS. 6-8 illustrate one implementation of the trench 10 in which each of the interconnected beams 20, 22, 24, 26, 28, 30 is formed of a foam encapsulated by a fiberglass reinforcement. Each of the other beams interconnected beams 20, 22, 24, 26, 30 is similarly formed in this illustrated implementation. FIGS. 6 and 7 show one of the longitudinal beams 20 including a foam beam **20*m* encapsulated by a fiberglass reinforcement 20*r* and the first side beam 28 including a foam beam 28*m* encapsulated by a fiberglass reinforcement 28*r*. FIG. 8 shows the plurality of transverse beams 22 each including a foam beam 22*m* encapsulated by a fiberglass reinforcement 22*r***.

Figure 9:
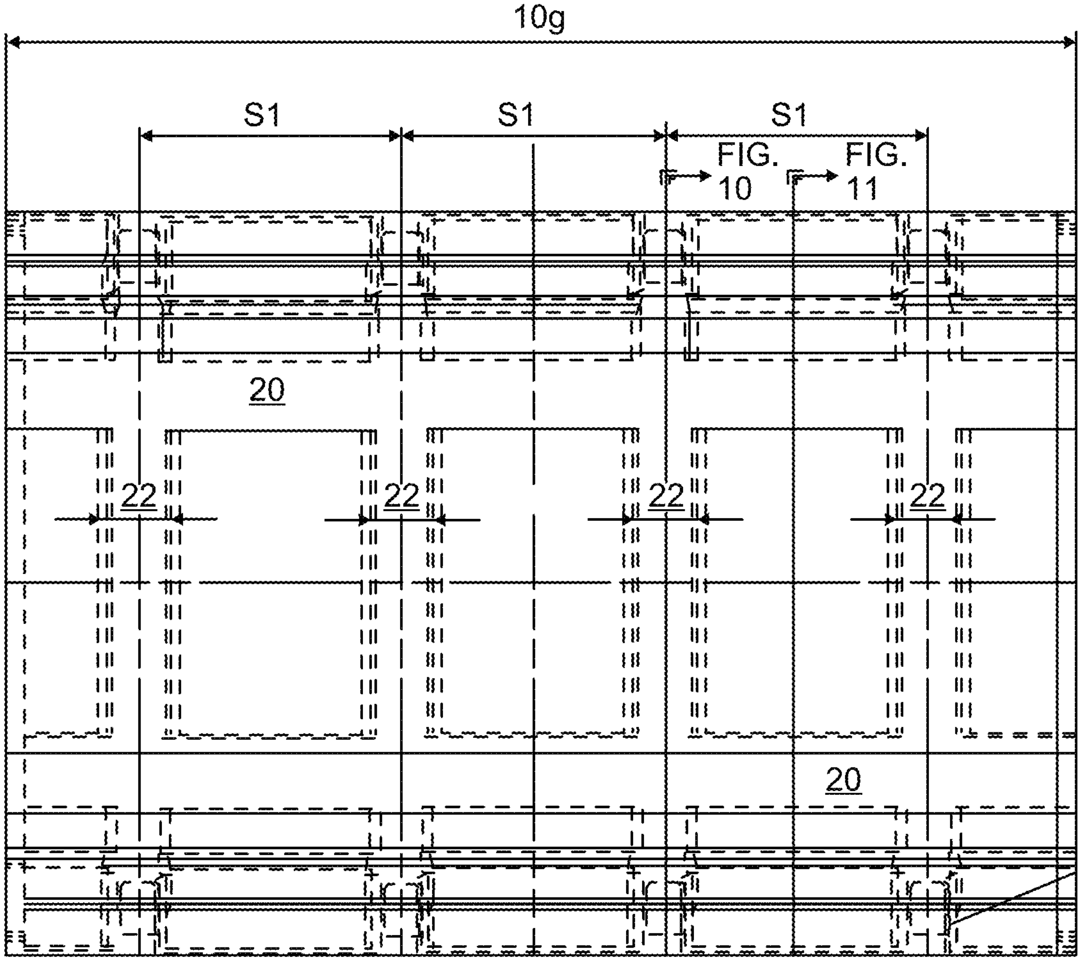
FIG. 9 is a schematic cross-sectional view of the trench of FIGS. 1 and 2.
Figure 10:
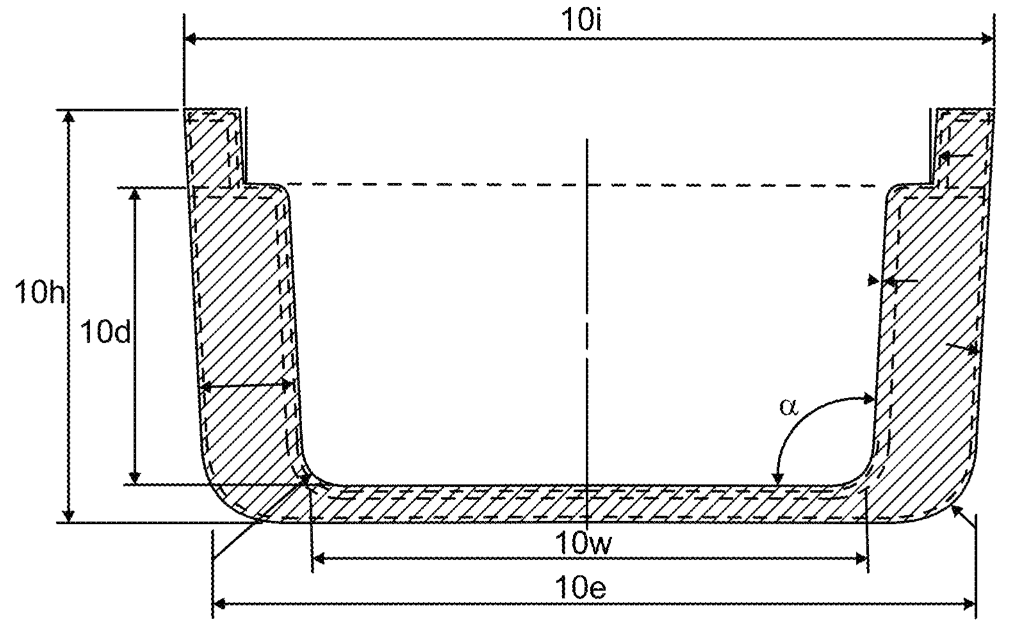
FIG. 10 is another schematic cross-sectional view of the trench of FIGS. 1 and 2.
Figure 11:
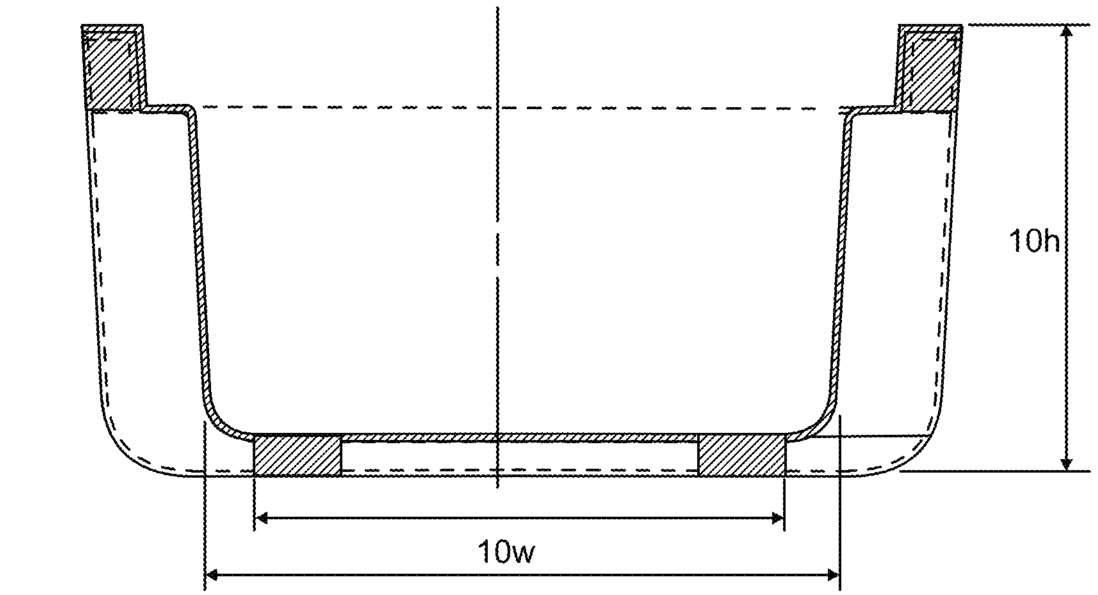
FIG. 11 is yet another schematic cross-sectional view of the trench of FIGS. 1 and 2.

The trench 10 of FIGS. 1 and 2 can have a variety of dimensions. In one implementation, shown in FIGS. 9-11, the trench 10 is about 30 inches wide **10*w* by about 16 inches deep 10*d* by about 60 inches long 10*g* (about 76.2 cm wide by about 40.64 cm deep by about 152.4 cm long). The about 30 inches width 10*w* is an interior width in the channel 18. The trench 10 in this illustrated implementation is about 40 inches (about 101.6 cm) wide 10*e* at an exterior of the bottom of the trench 10 and about 42.5 inches (about 107.95 cm) wide 10*i* at an exterior of the top of the trench 10. The about 16 inches depth 10*d* is an interior depth in the channel 18. The trench 10 in this illustrated implementation has a height 10*h* of about 22 inches (about 55.88 cm). FIG. 9 also illustrates the plurality of transverse beams 22 being spaced S1 substantially equidistantly from one another. FIG. 10 also illustrates that in this illustrated embodiment, the second side 16 is at an angle $\alpha$ of about 93 degrees with respect to the base 12. The first side 16 is also at an angle of about 93 degrees with respect to the base 12**.

Figure 12:
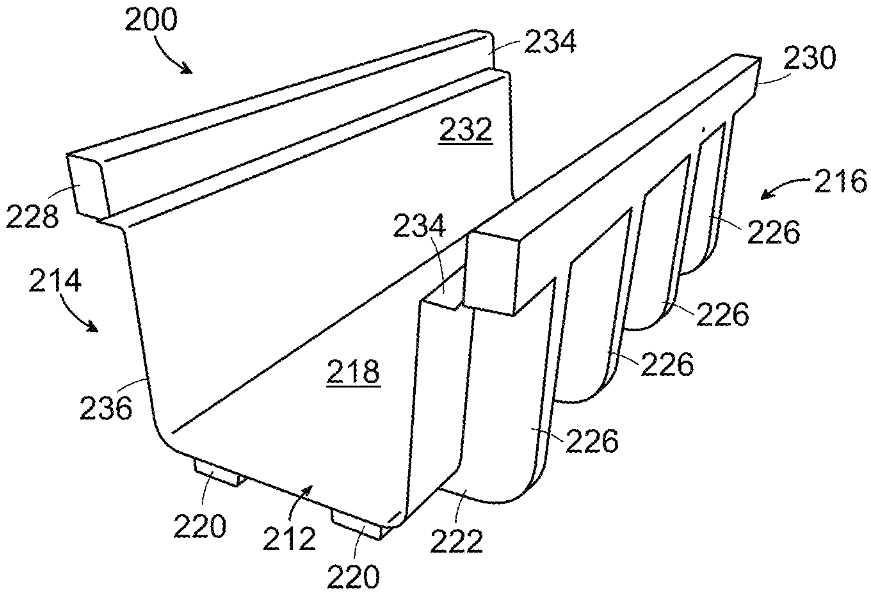
FIG. 12 is a perspective view of another implementation of a trench.

FIG. 12 illustrates another implementation of a trench 200 configured to deliver a service supply from a source to a point of use. The trench 200 is configured to be manufactured using a transfer molding process as described herein. The trench 200 is configured and used similar to the trench 10 of FIGS. 1 and 2, e.g., includes a base 212, a first side 214, a second side 216, a channel 218, a plurality of longitudinal beams 220, a plurality of transverse beams 222, a plurality of first side beams (obscured in FIG. 12), a plurality of second side beams 226, a first top beam 228, a second top beam 230, a shell 232, first and second rebates 234, a first ship lap 236, and a second ship lap (obscured in FIG. 12). However, in the illustrated implementation of FIG. 12, the trench 200 is about 20 inches wide by about 16 inches deep by about 60 inches long (about 50.8 cm wide by about 40.64 cm deep by about 152.4 cm long). The about 20 inches width is an interior width in the channel 218. The trench 200 in this illustrated implementation is about 30 inches (about 76.2 cm) wide at an exterior of the bottom of the trench 200 and about 32.5 inches (about 82.55 cm) wide at an exterior of the top of the trench 200. The about 16 inches depth is an interior depth in the channel 218. The trench 200 in this illustrated implementation has a height 10*h* of about 22 inches (about 55.88 cm).

Figure 13:
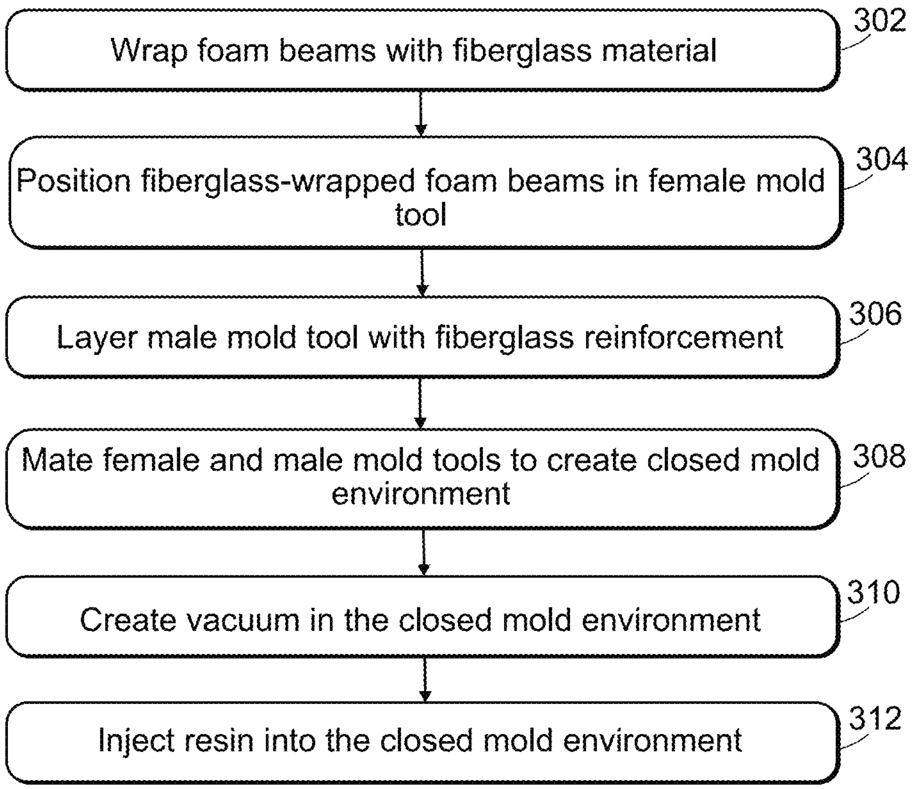
FIG. 13 is a flowchart of one implementation of a method of manufacturing a trench.

As mentioned above, in an exemplary implementation, trenches described herein are configured to be manufactured using a transfer molding process in which a casting material (e.g., a fiberglass resin) is forced into a closed mold environment. FIG. 13 illustrates one implementation of a method 300 of manufacturing a trench. The method 300 is described with respect to the trench 10 of FIGS. 1 and 2 for ease of explanation, but other implementations of trenches described herein can be similarly manufactured.

The method 300 includes wrapping 302 each individual foam beam with fiberglass material. As mentioned above, in an exemplary implementation, the foam is polyurethane. The fiberglass material is configured to provide reinforcement to effectively transfer and dissipate imposed loads and thereby improve strength and stiffness of the manufactured trench 10. In an exemplary implementation, the fiberglass material is a woven sheet or panel of fiberglass. FIG. 14 illustrates one implementation of a woven sheet or panel of fiberglass material 400.

The individual foam beams that are wrapped 302 are the beams that will form cores of the trench's interconnected support beams, e.g., the plurality of longitudinal beams 20, the plurality of transverse beams 22, the first and second side beams 24, 26, the first top beam 28, and the second top beam 30 of the trench 10 of FIGS. 1 and 2. Thus, for manufacturing the trench 10 of FIGS. 1 and 2, sixteen individual beams are wrapped 302 with fiberglass material.

The method 300 also includes positioning 304 each of the wrapped foam beams in a female mold tool. The wrapped foam beams can be positioned 304 in the female mold tool in any order. The female mold tool has a plurality of recesses formed therein that are configured to seat the wrapped foam beams therein. FIG. 15 illustrates one implementation of wrapped foam beams 402 positioned 304 in recesses formed in a female mold tool 404.

The recesses in the female mold tool have a size and shape corresponding to the size and shape of the wrapped foam beams configured to be seated therein. The wrapped foam beams will thus snugly fit within their respective recesses. However, in some implementations, a resin soluble adhesive is used to help hold the wrapped foam beams in place in the female mold tool during a remainder of the method 300.

In some implementations, the wrapped foam beams begin being positioned 304 in the female mold tool after all of the foam beams that will be used in manufacturing the trench 10 have been wrapped 302. In other implementations, at least one of the wrapped foam beams is positioned 304 in the female mold tool before a remainder of the foam beams that will be used in manufacturing the trench 10 have been wrapped 302.

Figure 17:
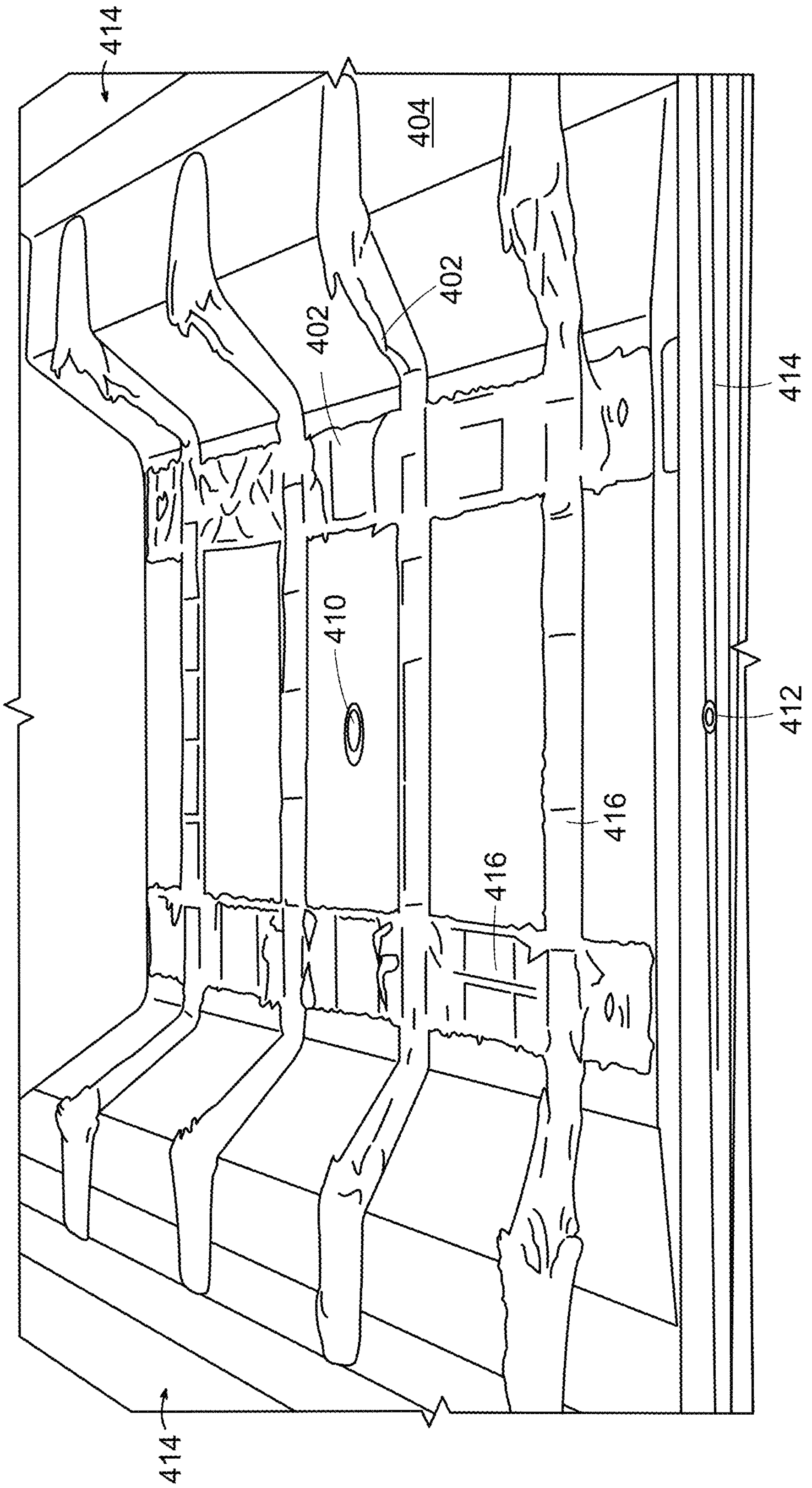
FIG. 17 is another perspective view of the female mold tool and fiberglass-wrapped foam beams of FIG. 15.

The method 300 also includes layering 306 a male mold tool with fiberglass material. In an exemplary implementation, the fiberglass material is a woven sheet or panel of fiberglass. In an exemplary implementations, multiple layers of fiberglass material are applied to the male mold tool. FIG. 16 illustrates one implementation of a male mold tool 406. The male mold tool 406 is partially shown in FIG. 16, but the opposite lateral side and the opposite end of the male mold tool 406 are similar to the lateral side and the end visible in FIG. 16. FIG. 17 illustrates a portion of the male mold tool 406 layered 306 with multiple layers of fiberglass material 408.

FIG. 13 shows the male mold tool being layered 306 after the foam beams 302 have been wrapped and positioned 304 in the female mold tool, but the male mold tool can be layered 306 before the foam beams 302 have been wrapped or before the wrapped foam beams have been positioned 304 in the female mold tool.

The method 300 also includes mating 308 the female mold tool and the male mold tool to form a closed mold environment. The mating 308 does not occur until the male mold tool has been layered 306 with fiberglass material and the wrapped foam beams have been positioned 304 in the female mold tool. In an exemplary implementation, the female mold tool is positioned above the male mold tool. The technique used to mate 308 the female mold tool and the male mold tool can vary based on a setup of the manufacturing environment. In one implementation, the male mold tool can be positioned on a manufacturing table or other surface, and the female mold tool can be lowered onto the male mold tool by hand and/or by machine. The female mold tool will thus be positioned above the male mold tool.

Gravity may be sufficient to mate 308 the female mold tool and the male mold tool together. However, the female and male mold tool can be clamped together to more closely mate 308 together the female mold tool and the male mold tool.

With the female and male mold tools mated 308 together to form a closed mold environment, a vacuum is created 310 in the closed mold environment. The vacuum is configured to evacuate any entrapped air from the closed mold environment and help close the female and mole tools tightly. In an exemplary implementation, the vacuum As shown for example in the implementation of FIG. 15, and also in FIG. 17, the female mold tool 404 includes a vent port 410 and a pair of injection ports 412. (Only one injection port 412 is visible in FIG. 17.) First tubing (not shown) is connected to the vent port 410, second tubing (not shown) is connected to a first one of the injection ports 412, and third tubing (not shown) is connected to a second one of the injection ports 412. The vacuum is configured to be created 310 through the tubing.

The method 300 also includes injecting 312 a casting material (e.g., resin as shown in FIG. 13) into the closed mold environment through the injection ports of the female mold tool (e.g., the injection ports 412 of the female mold tool 404 of FIGS. 15 and 17). The vacuum is also configured to help encourage flow of the casting material in the closed mold environment. The casting material can be injected 312 into the closed mold environment in a variety of ways. In an exemplary embodiment, the casting material is injected 312 into the closed mold environment under pressure. Injecting 312 under pressure with a vacuum created 310 in the closed mold environment helps force the casting material to flow in the closed mold environment. In an exemplary embodiment, the casting material is injected 312 into the closed mold environment using an injection pump. The injection pump can be, for example, at about 25 psi.

As shown for example in the implementation of FIG. 17, the female mold tool 404 includes a flow channel 414 in fluid communication with the injection ports 412. The flow channel 414 extends around a perimeter of the female mold tool 404. The casting material injected 312 into the closed mold environment through the injection ports 412 is configured to flow in the flow channel 414 to help direct the casting material throughout the closed mold environment, e.g., instead of pooling or concentrating near the injection ports 412.

As also shown for example in the implementation of FIG. 17, the wrapped foam beams 402 positioned in the female mold tool 404 each include flow channels 416 molded therein. The flow channels 416 are configured to allow the casting material injected into the closed mold environment to flow through the fiber architecture to extremities of the wrapped foam beams 402.

As in the illustrated implementation of FIGS. 15 and 17, the injection ports 412 can be located at a lowest point of the female mold tool 404, and the vent port 410 can be located at a highest point of the female mold tool 404. Injecting 312 the casting material under pressure into the closed mold environment having a vacuum created 310 therein will urge the casting material to flow through the closed mold environment, guided by the flow channels 414, 416, and upward toward the vent port 410. Casting material exiting the vent port 410 indicates that the closed mold environment has been filled with the casting material, and injection 312 of the casting material is stopped.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

Those skilled in the art will understand that the systems, devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present disclosure has been described above by way of example only within the context of the overall disclosure provided herein. It will be appreciated that modifications within the spirit and scope of the claims may be made without departing from the overall scope of the present disclosure.

What is claimed is:

1. An apparatus for delivering a service supply, comprising:

a trench configured to be buried underground to allow a service supply to pass therethrough from a source of the service supply to a point of end use, wherein the trench comprises:

a base, first and second sides extending upwardly from the base, the first and second sides being opposed to one another, first and second longitudinal beams on a bottom side of the base, a plurality of transverse beams on the bottom side of the base that extend transverse to the pair of longitudinal beams, a plurality of first side beams that extend upwardly from the base on an outer side of the first side, a plurality of second side beams that extend upwardly from the base on an outer side of the second side, a first top beam extending longitudinally along a top of the first side, and a second top beam extending longitudinally along a top of the second side;

wherein foam is surrounded by fiberglass within each of the first and second longitudinal beams, the plurality of transverse beams, the plurality of first side beams, the plurality of second side beams, the first top beam, and the second top beam.

2. The apparatus of claim 1, wherein the first and second longitudinal beams, the plurality of transverse beams, the plurality of first side beams, the plurality of second side beams, the first top beam, and the second top beam are interconnected.

3. The apparatus of claim 2, wherein the foam of plurality of first side beams is directly connected to the foam of the first top beam and to the foam of the first longitudinal beam, the foam of the plurality of second side beams is directly connected to the foam of the second top beam and to the foam of the second longitudinal beam, and the foam of the first and second longitudinal beams is directly connected to the foam of the plurality of transverse beams.

4. The apparatus of claim 3, wherein the foam is polyurethane.

5. The apparatus of claim 1, wherein the fiberglass has a varying thickness.

6. The apparatus of claim 1, wherein the plurality of transverse beams extend substantially perpendicular to the first and second longitudinal beams and the first and second top beams.

7. The apparatus of claim 1, wherein the trench has first and second opposed ends each being substantially U-shaped.

8. The apparatus of claim 7, wherein the first end of the trench is configured to be fixedly attached to a third end of a second trench via a lap joint, and the second end of the trench is configured to be fixedly attached to a fourth end of a third trench via a lap joint.

9. The apparatus of claim 1, wherein the foam is polyurethane.

10. The apparatus of claim 1, wherein the service supply is fuel, the source of the service supply is an underground reservoir, and the point of end use is a fuel dispenser.

* * * * *